United States Patent Office 3,180,826
Patented Apr. 27, 1965

3,180,826
ANTISTATIC AGENT FOR TEXTILE MATERIALS
John D. Spivack, Spring Valley, N.Y., assignor to Geigy Chemical Corporation, Ardsley, N.Y.
No Drawing. Filed May 3, 1962, Ser. No. 192,082
5 Claims. (Cl. 252—8.8)

This invention relates to a novel and useful antistatic agent for textile materials and the like.

The prevention of build-up of a static charge on various materials such as textile materials: wool, silk, nylon, etc. is a long-standing problem in the art. A number of antistatic agents have been proposed; however, the art is constantly seeking for new agents of this character.

According to the present invention, methylimino-bis-propionamide

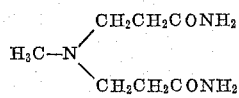

is a highly useful, readily obtainable, and easily applicable antistatic agent. The compound is also useful as an additive to resins, especially epoxy resins, for the purpose of effecting the hardening thereof.

While the active antistatic agent of the present invention can be prepared in a number of ways, the hereinafter specifically exemplified procedure is presently preferred. The process is simple, the reactants are readily available, and a high yield is obtained. Application of the new antistatic agent to textile materials can also be realized in a number of ways. The presently preferred way, hereinafter specified in connection with nylon textile fabric, is constituted by the simple procedure of immersing the fabric in a solution of the antistatic agent, expressing the impregnated fabric to the desired content of active agent, drying and conditioning. The solution may conveniently be an aqueous lower alkanolic solution, e.g. an ethanolic, propanolic, butanolic or the like solution but preferably an aqueous methanolic solution containing from about 0.05% to about 5% by weight of active antistatic agent. A content of from about 0.05% to about 5% by weight of said active antistatic agent in the expressed or wrung out fabric will effectively prevent undesired build-up of static charge on the treated materials.

The term "nylon" as used in the intsant specification refers to any of the commercial forms of nylon used in making textile fabrics and the like. Thus, the nylon fibers may be made of nylon type 66, nylon type 6, nylon type 11, etc. (cf. Speel et al., Textile Chemicals and Auxiliaries, 2nd edition, 1957, Reinhold Publishing Company, New York).

The present application is a continuation-in-part of the copending application Serial No. 777,587, filed December 2, 1958, Serial No. 831,019 having been filed August 3, 1959, now Patent 3,048,620.

In the following example, parts are by weight unless otherwise indicated and the relationship between parts by weight and parts by volume is that of grams to cubic centimeters.

EXAMPLE 1

Methylimino-bis-propionamide 355 parts of acrylamide are dissolved in 500 parts by volume of water and the resultant solution is cooled to 10° C. 152.6 parts of aqueous methylamine (40.6%) are added dropwise to said solution over a period of one hour, the temperature of the reaction mixture being kept below a maximum of 41° C. by cooling in an icewater bath. The reaction solution is heated at 85 to 90° C. for six hours and concentrated to a pale yellow viscous syrup at 10 to 15 mm. Hg pressure. (Analysis of the reaction solution at the end of the heating period indicates 100% reaction.) The viscous syrup is triturated with 750 parts by volume of methanol and crystallizes spontaneously. The first crop of methylimino-bis-propionamide crystals is filtered (177 parts) and the filtrate is concentrated by removal of methanol by distillation. 250 parts by volume of isopropanol are added and an additional 102 parts of final product are obtained. Total yield is 81 percent of theory. The crystals melt at 109 to 110° C. and upon recrystallization from methanol they melt at 111–112° C. after drying.

Analysis (basic nitrogen equivalent weight): Calculated for $C_7H_{15}N_3O_2$—173; Found—177.

EXAMPLE 2

Antistatic activity

Scoured nylon fabric (nylon 66) is immersed in methanolic aqueous solutions containing 0.5% by weight of methylimino-bis-propionamide, based upon the total weight of solution: Swatches of the nylon so treated are wrung out to contain about 0.25% of the antistatic agent methylimino-bis-propionamide. The swatches are air-dried and conditioned for two days at 40% relative humidity. Finally, the so conditioned swatches are measured for surface resistivity at 40% relative humidity, 70° F. Methylimino-bis-propionamide exhibits an antistatic activity of $85 \times 10^{10}$ ohms per square. Solutions containing 0.1% and 1% respectively of methylimino-bis-propionamide result in a pick up of 0.05%, and 0.5% respectively, by the fabric and are thus also effective in preventing static charge build-up.

Build-up of a static charge on other textile materials, such as wool, silk and the like, is effected in analogous manner.

What is claimed is:

1. The method of imparting to textile fabric resistance to static charge build-up which comprises incorporating into the fabric methylimino-bis-propionamide as an active antistatic agent in an amount of from about 0.05% to about 5%, based upon the dry weight of said fabric.

2. Textile material resistant to static charge build-up comprising textile fibers impregnated with methylimino-bis-propionamide as an active antistatic agent, said antistatic agent being present in an amount of from about 0.05% to about 5% based upon dry weight of said material.

3. A textile material impregnating composition for imparting to the said material resistance to static charge build-up consisting essentially of an aqueous lower alkanoic solution of methylimino-bis-propionamide, said solution containing from about 0.5% to about 5% by weight of methylimino-bis-propionamide.

4. A textile material impregnating composition for imparting to the said material resistance to static charge build-up consisting essentially of an aqueous methanolic solution of methylimino-bis-propionamide, said solution containing from about 0.05% to about 5% by weight of methylimino-bis-propionamide.

5. A textile material impregnating composition for imparting to the said material resistance to static charge build-up consisting essentially of an aqueous methanolic solution of methylimino-bis-propionamide, said solution containing 0.5% by weight of methylimino-bis-propionamide.

References Cited in the file of this patent
UNITED STATES PATENTS

| | | |
|---|---|---|
| 2,844,629 | Bruce et al. | July 22, 1958 |
| 2,856,427 | Bruce et al. | Oct. 14, 1958 |
| 2,877,178 | Bergman et al. | Mar. 10, 1959 |
| 3,048,539 | Kocay et al. | Aug. 7, 1962 |
| 3,048,620 | Spivack | Aug. 7, 1962 |

UNITED STATES PATENT OFFICE
CERTIFICATE OF CORRECTION

Patent No. 3,180,826                                          April 27, 1965

John D. Spivack

It is hereby certified that error appears in the above numbered patent requiring correction and that the said Letters Patent should read as corrected below.

Column 2, line 51, for "0.5%" read -- 0.05% --.

Signed and sealed this 21st day of September 1965.

(SEAL)
Attest:

ERNEST W. SWIDER
Attesting Officer

EDWARD J. BRENNER
Commissioner of Patents